March 25, 1958     HECTOR CABALLEROS M.     2,827,795
CLUTCHLESS VARIABLE SPEED TRANSMISSION
Filed Dec. 23, 1954     2 Sheets-Sheet 1
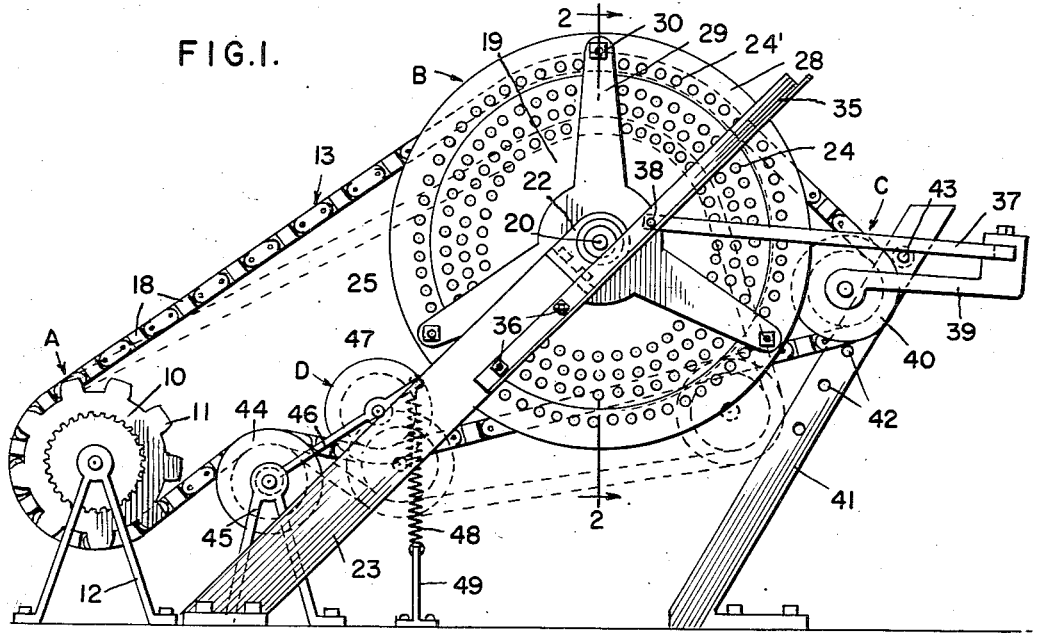
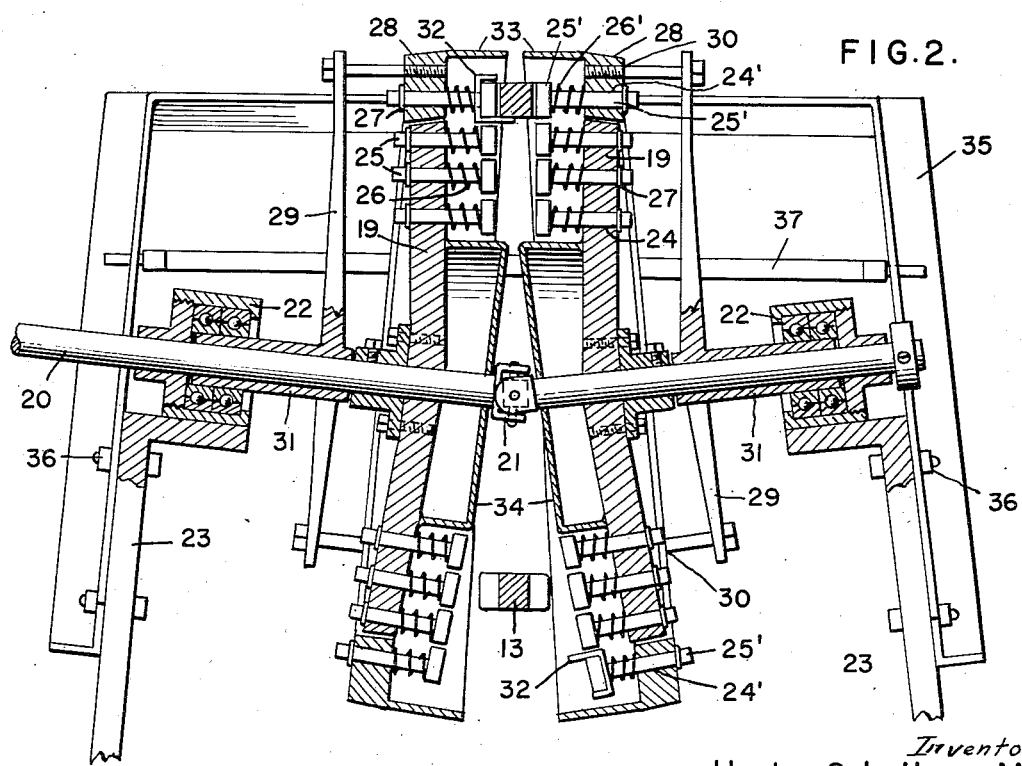
Inventor
Hector Caballeros M
By B. J. Garvey
ATTY.

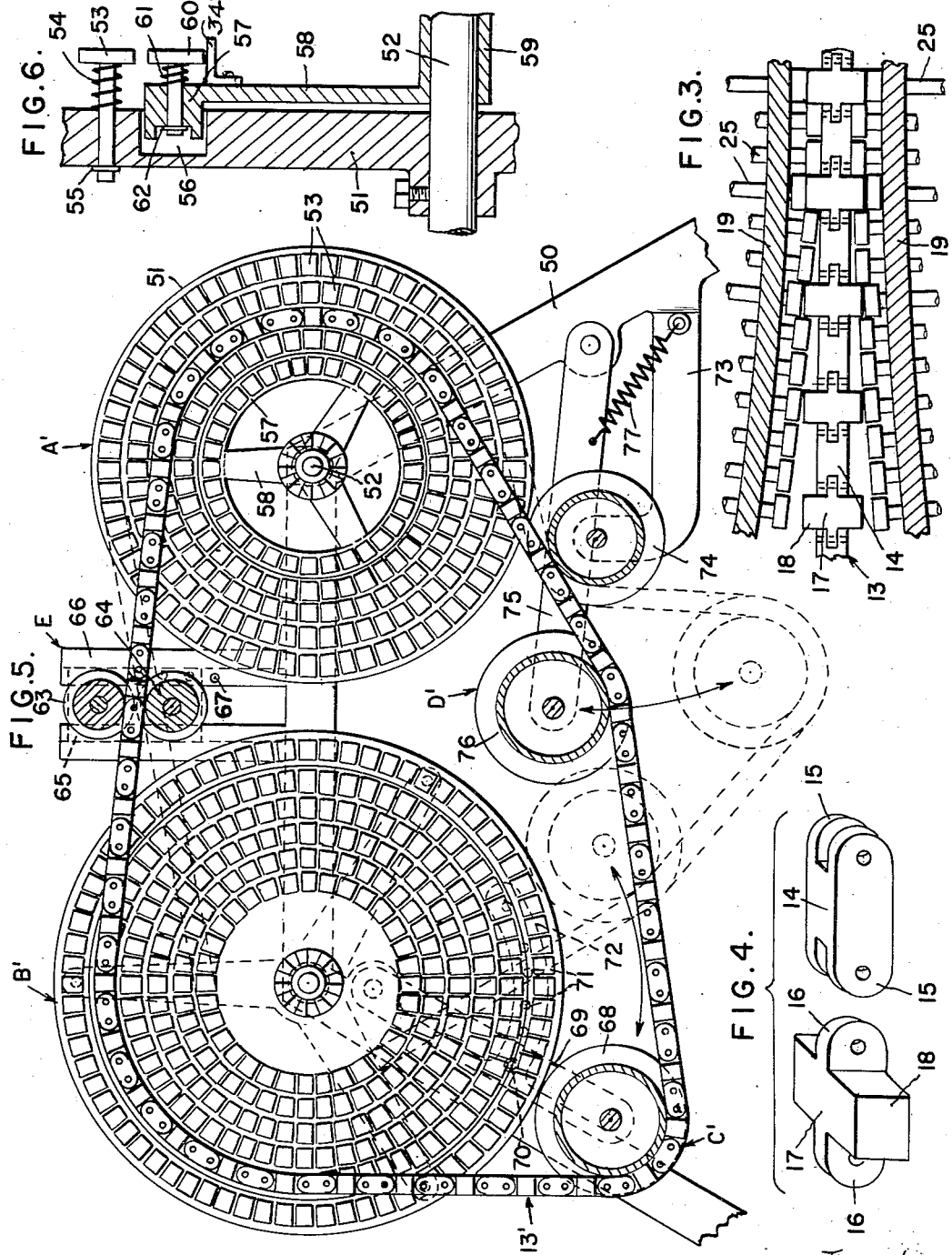

United States Patent Office 2,827,795
Patented Mar. 25, 1958

2,827,795

CLUTCHLESS VARIABLE SPEED TRANSMISSION

Hector Caballeros M., Guatemala City, Guatemala

Application December 23, 1954, Serial No. 477,147

9 Claims. (Cl. 74—217)

This invention relates to a transmission and more particularly to a variable speed transmission assembly requiring no clutch release.

It is an object of this invention to provide a clutchless variable speed transmission assembly to expeditiously vary the speed and power ratio between the drive and driven units in a facile manner without interruption of the driving force.

Another object is to provide a transmission assembly in which opposed discs are connected for simultaneous divergent and convergent movement, the proximate faces of the discs being spaced and provided with circular rows of yieldable keys selectively engaged and depressed by an endless chain to transmit rotary motion from the drive to the driven unit, means being provided to effect a smooth, gradual change in the speed ratio between the two units.

A further object is to provide a transmission assembly including a drive unit and a driven unit, each of said units having a pair of opposed discs engaged by an endless chain, means being provided to locate the endless chain of points near or remote from the center of the discs of either unit, thereby affording a large number of possible speed and power ratios between the two units.

Other objects of the invention will be apparent from the following description of the present preferred forms of the invention, taken in connection with the accompanying drawings, wherein:

Fig. 1 is a side elevational view of the preferred form of the present invention;

Fig. 2 is a vertical sectional view taken along the line 2—2 of Fig. 1, looking in the direction of the arrows;

Fig. 3 is a fragmentary sectional view of the opposed discs forming a part of the present invention, showing to advantage the manner of engagement of the endless chain therewith;

Fig. 4 is a perspective view of a pressing link and a traction link which comprise the endless chain forming a part of the present invention;

Fig. 5 is a side elevational view of a modified form of the present invention, looking at the inner faces of the drive and driven units, illustrating the manner in which the drive chain is engaged with the keys of the units; and Fig. 6 is an enlarged fragmentary sectional view of a disc forming a part of the drive unit in the form of invention illustrated in Fig. 5, and showing the manner of attaching the inner or "neutral" ring to the unit.

There is shown in Figs. 1 to 4, one form of the present invention which comprises generally a drive unit A connected by an endless chain to a driven unit B. Mounted adjacent driven unit B is a chain guide member C. A tensioning unit D maintains the chain taut at all times.

In this form of invention, drive unit A comprises a conventional sprocket 10 having two parallel rows of teeth 11, the sprocket chain being rotatably mounted on a suitable support 12. Rotation of the sprocket 10 is effected by any suitable power means. Engaged with the sprocket 10 is an endless chain 13, which extends to driven unit B. As shown to advantage in Fig. 4, this chain comprises pressing links 14, each terminal of each link being provided with a pair of apertured ears 15 adapted for the reception of an apertured extension 16 of a traction link 17. Conventional pin means are employed to join the links. Links 17 are further provided with projections 18 adapted to extend laterally between successive pairs of the sprocket teeth 11, the projections 18 being also adapted for selective engagement with movable keys forming a part of the driven unit B, which latter will be presently described in detail.

Driven unit B comprises a pair of opposed cone-shaped discs 19 which are positioned for simultaneous convergent and divergent movement with the axes thereof disposed at such an angle that the faces thereof are parallel through a small arc (see Fig. 2). Discs 19 are affixed to central power shafts 20, the inner terminals of which are joined by a conventional universal connection 21. Shafts 20 are rotatably mounted, at points remote from their inner terminals, in bearing blocks 22, the latter being supported by struts 23. As shown to advantage in Figs. 1 and 2, each disc is provided with circular, concentric rows of spaced openings 24 adapted for the reception of square-headed, yieldable keys 25. The heads of keys 25 are normally urged away from discs 19 by coil springs 26 convoluted about the key shaft between disc 19 and the key head. A lock nut 27 placed near the shaft terminal of key 25, prevents the key from falling out of opening 24. During travel of the chain 13, parallel selected keys in the convergent sector (top of Fig. 2) of the discs, are depressed under force exerted thereon by the projections 18 to effect engagement of the chain with the driven unit and consequent rotation of discs 19. Fig. 3 fragmentarily shows this step-by-step operation.

Referring now to Figs. 1 and 2, it will be seen that discs 19 are concentrically mounted in annular rings 28, each having a single circular row of openings 24' in which are yieldable keys 25' including soil springs 26' and lock nuts 27'. Rings 28 are supported by spiders 29 affixed to the rings at 30, the spiders radiating from hubs 31 which are sleeved on the shafts 20 in a manner shown in detail in Fig. 2. By this arrangement of parts, upon rotation of the rings under power applied to them by drive unit A acting through chain 13, discs 19 and shafts 20 do not rotate since there is no operative connection between the annular rings and these members. At this time the driven unit is in "neutral" position.

Keys 25' of rings 28 are provided at intervals with substantially U-shaped clips 32, one terminal of which projects inwardly beyond the key head to prevent chain 13 from contacting keys 25 of discs 19 when the assembly is in neutral position. Rings 28 are also provided with lips 33 about their outer periphery to prevent chain 13 from beciming accidentally disengaged from keys 25'. The opposed faces of discs 19 are provided near the center with crowns 34, the outer peripheries of which are adjacent to and extend inwardly beyond the heads of keys 25 in the convergent sector. This proximity of the crowns prevents chain 13 from dropping inwardly toward the center of discs 19.

For controlling the speed ratio between drive unit A and driven unit B, there is provided a chain guide member C positioned adjacent the latter unit and adapted to feed the chain to the selected circular row of yieldable keys. This member includes a U-shaped frame 35, the terminals of which are secured to struts 23 at 36. Intermediate the parallel sides of the frame is positioned a second U-shaped frame 37, to the terminals of which are secured pins 38 journaled in frame 35. Mounted on the cross member of frame 37 is a suitable bearing member 39 adapted for holding a guide wheel 40. To adjust the position of frame 37 and guide wheel 40, there is provided an upright 41 disposed at an angle to the vertical and having a plurality of openings 42. Openings 42 are adapted for the reception of an adjustment pin 43 which contacts the underside of frame 37 to hold the latter in any desired position. In order to change speed, it is only necessary to relocate pin 43 in a different opening 42 and to move frame 37 into contiguous relation therewith. Openings 42 are strategically located so that as the pin and frame are moved downwardly to the next lower opening, chain immediately initiates engagement with the adjacent inner row of keys. The change in speed is therefore effected smoothly and gradually.

To keep chain 13 taut at all times, there is provided a tensioning unit D which is interposed between drive unit A and guide member C. This unit comprises a stationary pulley 44 rotatably mounted in any suitable support 45. A pair of arms 46 connected to and movable with respect to support 45 are adapted for the reception of a second pulley 47. To the free terminals of arms 46 are attached coil springs 48, the lower ends of which are connected to a stationary support 49. Pulley 47 is thereby constantly urged downwardly to keep the assembly free of slack in the chain.

In operation, sprocket 10 is rotated by any suitable power source, which rotation advances chain 13 in the direction indicated by the arrow in Fig. 1. The chain engages the top surface of pulley wheel 44 and the under surface of pulley wheel 47, from which point it extends to guide wheel 40. The position of guide wheel 40 determines which row of keys chain 13 engages, the guide wheel being so located that it feeds the links to the rows of keys at the point where the keys engage the links and are depressed thereby. When pin 43 is engaged in one of the three lower openings 42, chain 13 will correspondingly engage the yieldable keys 25 of the corresponding circular row of discs 19 to vary the speed of discs 19 and shafts 20. If pin 43 is engaged in top opening 42, then chain 13 meshes with yieldable keys 25' of annular ring 28. Since ring 28 rotates independently of discs 19 and shafts 20, these latter members do not move and the driven unit is in "neutral" position.

In Figs. 5 and 6, there is shown a modified form of the present invention in which a larger number of speed and power ratios between the drive and driven units is available by virtue of the fact that both of these units comprise opposed discs and means are provided for locating the endless chain near or remote from the center of the discs of either unit. The modified form includes a drive unit A' operatively connected to a driven unit B' by an endless chain 13'. A driven guide wheel member is indicated at C', a tensioning unit at D' and a drive guide wheel member at E.

This form of the invention comprises a suitable stand 50 on opposed ends of which are mounted units A' and B'. Drive unit A' comprises a pair of opposed conical discs 51 similar to those shown and described in the main form of the invention. Each disc is mounted on a shaft 52 and has rows of circular openings in which are positioned square-headed yieldable keys 53 urged away from discs 51 by coil springs 54, the keys being held in the openings by lock nuts 55. Each disc 51 is provided at a point near its center with a circular channel 56 adapted for the reception of an annular ring 57 (see Fig. 6). Ring 57 is maintained in position by a spider 58 secured thereto at points along its periphery, the spider radiating from hub 59 which is sleeved on shaft 52. Ring 57 is provided with a circular row of openings adapted to receive yieldable keys 60, urged away from ring 57 by coil spring 61 and retained in the openings by a lock nut 62. Since there is no operative connection between ring 57 and shaft 52, upon engagement of chain 13' with this row of yieldable keys, ring 57 alone rotates, thereby providing a "neutral" position of the drive unit.

To select the desired circular row of yieldable keys for engagement by chain 13', there is provided a drive guide wheel member E which is supported by stand 50. This member includes a pair of vertically aligned pulleys 63 and 64 between which chain 13' passes. Pulleys 63 and 64 are journaled in a bearing 65, the latter being slidably movable in a vertical channel member 66. Bearing 65 and channel member 66 are provided with openings 67 which are aligned and a retaining pin placed therein, to hold the pulleys in the desired position. The location of pulleys 63 and 64 determine the row of keys which chain 13' will engage. The representation of the chain in dotted lines in Fig. 5 clearly illustrates this effect, brought about by lowering pulleys 63 and 64.

Driven unit B' is essentially the same as driven unit B in the main form of the present invention with the exception that more circular rows of yieldable keys are provided, to allow a greater variety of speed changes in the assembly.

For feeding chain 13' to driven unit B', there is provided a driven guide wheel member C' which comprises a pulley 68 carried by an arm 69, hingedly secured at its free end to stand 50. Arm 69 has an opening 70 adapted to be aligned with one of a plurality of openings 71 in an adjustment arm 72, which is secured to stand 50. Any suitable pin may be used for retaining the pulley in the desired position. As arm 69 is swung to its various positions, chain 13' will engage different circular rows of the yieldable keys in the manner described in detail in connection with the form of invention shown in Figs. 1 to 4.

To keep the transmission assembly free of slack, there is interposed between driven guide wheel member C' and drive unit A', a tensioning unit D'. This unit comprises a stationary arm 73 affixed to stand 50, on the free end of which arm is rotatably mounted a pulley 74, the upper surface of which is engaged by chain 13', as it comes from drive unit A'. There is also provided a movable arm 75, one end of which is pivoted to stand 50 and the other end of which is provided with a rotatable pulley 76. Pulley 76 is so located that chain 13' engages the underside thereof. To constantly relieve the assembly of slack chain, a coil spring 77 is connected from stationary arm 73 to movable arm 75, thereby exerting a downward force on pulley 76 at all times. When slack is created in the chain by adjustment of drive guide wheel member E and driven guide wheel member C', pulley 76 and chain 13' drop to the position shown in dotted lines in Fig. 5.

The operation of this modified form of the present device is similar to that of the assembly shown in Figs. 1 to 4. However, the speed and power ratios between the drive and driven units may be varied by adjustment of driven guide wheel member C' to selectively engage the desired row of yieldable keys of driven unit B' or by the raising or lowering of pulleys 63 and 64 comprising drive guide wheel member E to selectively engage chain 13' with any one of the circular rows of yieldable keys of drive unit A'. With this form of the present invention, it is also possible to adjust the transmission assembly to a "neutral" position either by engaging chain 13' with the outer row of yieldable keys of driven unit B' or by adjusting chain 13' to engage the inner row of yieldable keys of drive unit A'.

To prevent casual downward movement of the chain 13', each of the spider elements 58 is equipped with an abutment 34' which serves the same purpose as the crowns 34.

While present preferred forms of the invention have been described, it is nevertheless to be understood that various changes may be made therein, within the scope of the claims hereto appended.

What I claim is:

1. A clutchless variable speed transmission including opposed interconnected transmission bodies the axes of rotation of which bodies are disposed at an angle to each other for simultaneous operation, each of said bodies comprising independent pressure responsive zones and each zone composed of multiple, movable integers and a power transmission unit adapted for operative engagement with said bodies, including a drive unit and a belt movable between the drive unit and transmission bodies and provided with means selectively engageable with corresponding zone integers of the bodies to effect movement of said zone integers and positive engagement of said belt with said transmission bodies.

2. A clutchless variable speed transmission including opposed interconnected transmission bodies the axes of rotation of which bodies are disposed at an angle to each other for simultaneous divergent and convergent movement, the proximate faces of the bodies being spaced, circular rows of yieldable keys mounted in the proximate faces of said bodies and a power transmission unit comprising a drive unit and a belt movable between said drive unit and said transmission bodies and provided with means engageable with parallel rows of keys of said bodies to effect positive engagement of said belt with said transmission bodies.

3. A clutchless variable speed transmission as in claim 2 with the addition of means to bodily move the belt from one row to another of said keys.

4. A clutchless variable speed transmission as in claim 2 wherein each body is provided with an annular ring rotatable independently of the body, said ring having a circular row of opposed yieldable keys engaged by said belt to effect a neutral position of the transmission.

5. A clutchless variable speed transmission including a drive unit and a driven unit, each of said units comprising opposed interconnected transmission bodies the axes of rotation of which bodies are disposed at an angle to each other for simultaneous divergent and convergent movement, the proximate faces of the bodies being spaced, circular rows of yieldable keys mounted in the proximate faces of said bodies and a belt engageable with parallel rows of keys on the bodies of said units to transmit power from the drive unit to the driven unit.

6. A clutchless variable speed transmission including opposed interconnected transmission discs, the axes of rotation of which are disposed at an angle to each other for simultaneous divergent and convergent movement, the proximate faces of the discs being spaced, circular rows of yieldable keys mounted in the proximate faces of said discs, a drive unit, and a pitch chain connected to said drive unit and adapted for engagement with said circular rows of yieldable keys, said chain comprising pressing links and traction links, the latter being adapted to depress selected yieldable keys to effect positive engagement of said chain with said discs.

7. A clutchless variable speed transmission including opposed interconnected cone-shaped discs, the axes of rotation of said discs being disposed at an angle with respect to each other for simultaneous divergent and convergent movement, the proximate faces of the discs being spaced, circular rows of yieldable keys mounted in the proximate faces of said discs, and a power transmission unit adapted for operative engagement with said discs and including a drive unit, a driving chain connecting said drive unit to said discs, said chain being movable between said discs and engageable with the circular rows of yieldable keys, the power transmission unit also including adjustable guide means for controlling the direction of feeding said chain between said discs to effect selective engagement with the rows of yieldable keys for changing the speed of rotation of the discs.

8. A clutchless variable speed transmission including a drive unit and a driven unit, each of said units comprising opposed interconnected cone shaped discs, the axes of rotation of which discs are disposed at an angle to each other for simultaneous divergent and convergent movement, the proximate faces of the discs being spaced, circular rows of yieldable keys mounted in the proximate faces of said discs and a chain movable between the drive unit and the driven unit, said chain comprising pressing links and traction links, the latter being adapted to depress selected yieldable keys to effect positive engagement of said chain with said discs.

9. A clutchless variable speed transmission as in claim 8 with the addition of adjustable guide means for controlling the direction of feeding said chain between the discs of said drive unit and said driven unit to effect selective engagement with the rows of yieldable keys for changing the speed-power ratio between the drive unit and the driven unit.

References Cited in the file of this patent

FOREIGN PATENTS 364,693    Italy _____ Nov. 11, 1938